June 8, 1926.
J. M. JACKSON
VEHICLE BODY
Filed June 24, 1924
1,587,909
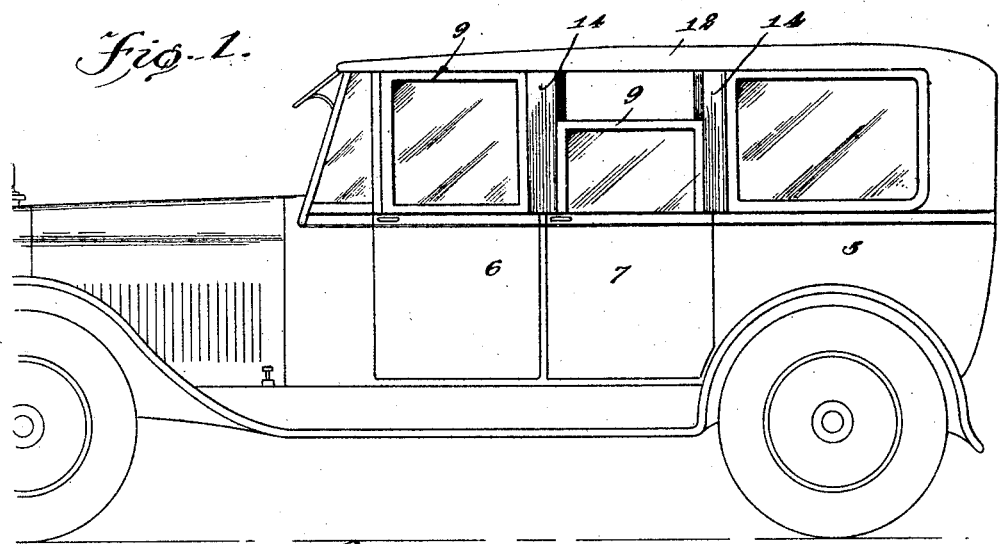
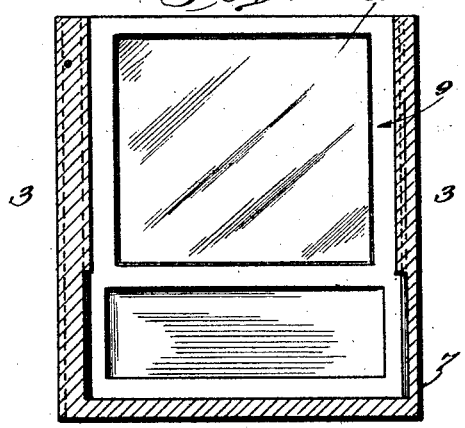
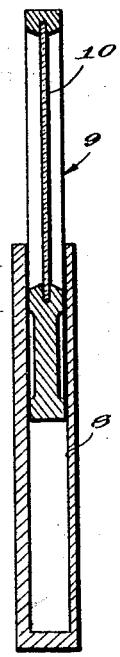
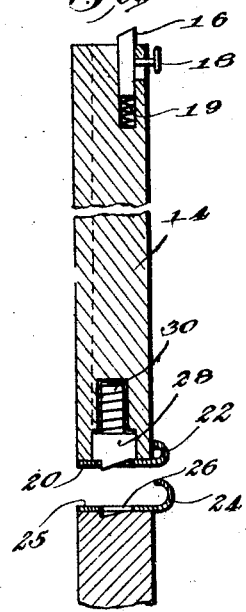
WITNESSES
INVENTOR
J. M. Jackson,
BY
ATTORNEYS Patented June 8, 1926.

1,587,909

UNITED STATES PATENT OFFICE.

JAMES MADISON JACKSON, OF PARKERSBURG, WEST VIRGINIA.

VEHICLE BODY.

Application filed June 24, 1924. Serial No. 722,062.

This invention relates to bodies especially adapted for use on motor vehicles and an important aim is to provide novel means whereby to completely close the body in when desired.

A further object is to provide a vehicle body having posts which may be detachably arranged between the extensible portions of the doors and which may be conveniently removed when the extensible portions of the doors are lowered.

A further object of the invention is to provide a vehicle body of the character specified which is of highly simplified construction, durable in use and cheap to manufacture.

Other objects and advantages will be apparent during the course of the following description.

In the accompanying drawing forming a part of this application and in which like numerals are employed to designate like parts throughout the same, Figure 1 is a side elevation of a vehicle body constructed in accordance with this invention, Figure 2 is a vertical sectional view through one of the doors constructed in accordance with this invention, the extensible portion of the door being lowered, Figure 3 is a horizontal sectional view taken on line 3—3 of Figure 2, Figure 4 is a vertical transverse sectional view through the door, the extensible portion of the door being elevated or in its uppermost position, Figure 5 is a fragmentary sectional view through one of the detachable standards or posts adapted to be positioned between the top and the upper edge of the vehicle body when the extensible portions of the doors are elevated.

In the drawing, wherein for the purpose of illustration is shown a preferred embodiment of the invention, the numeral 5 designates a vehicle body having front and rear doors 6 and 7, respectively. Each door is formed with a pocket or compartment 8 as illustrated in Figures 3 and 4 to receive a slidable section 9 having a transparent panel 10. When the said sections 9 are raised they will contact with the top 12 and co-act with the top and detachable posts 14 in closing the body.

However, when the sections 9 are lowered into the compartment 8, the posts 14 may be readily removed and stored in any convenient place about the automobile. It will be seen that a latch 16 is slidably mounted in the upper portion of each detachable post 14 and is provided with a handle or knob 18 by means of which the latch may be forced downwardly against the tension of a coil spring 19. The latch 16, of course, is adapted to engage in a suitable socket or notch in the top 12, and when the latch is drawn downwardly it is released from engagement with the top so that the post 14 may be withdrawn from its position between the edges of the slidable sections 9.

The lower portions of the detachable posts 14 are provided with locking face plates 20 having curved terminal portions 22 extended beyond the one side of the posts and adapted to be fit within the curved terminal portions 24 of the fastening plates 25.

The fastening plates 25 are secured in any suitable manner to the upper edge of the sides of the body and are provided with openings 26 for the reception of the lower terminal portions of spring-actuated bolts 28. The several spring-actuated bolts 28 are housed in the lower portions of the posts 14 and have shanks which are received in coil springs 30. The coil springs 30 urge the latches to their operative positions and the coil spring 30 will exert great pressure upon the plate 25. This pressure will have a tendency to force the top of the post upwardly, thus maintaining a constant pressure which will under all circumstances prevent rattling.

It will be seen that when the posts 14 are positioned between the upper edges of the body and the underside of the top that the latches 16 and 28 will move to operative position and thereby hold the posts securely in position, so that when the sections 9 are raised the body will be completely closed. The posts 14 are provided with a reliable means for maintaining an approximately air tight connection between the edges of the extensible sections 9.

With reference to the foregoing description, taken in connection with the accompanying drawing, it will be seen that when the windows are down the posts may be removed so that the vision of the vehicle occupants is not in any way obstructed or interfered with.

I claim:

The combination with a vehicle body, of a top therefor, doors carried by the vehicle body and having pockets, transparent sections slidable in said pockets, detachable posts arranged to receive and hold said transparent sections and disposed between the body and the top, spring-actuated bolts carried by the upper portions of said posts and adapted to engage said top, spring-actuated bolts carried by the lower portions of said posts and adapted to engage the upper edge of said body, and co-acting face plates carried by the opposed edges of said posts and the body and having laterally extending curved terminal portions adapted to interlock and to co-operate with the second-named bolt in holding the lower portions of the posts in position and in airtight relation.

JAMES MADISON JACKSON.